United States Patent [19]

Anderson et al.

[11] Patent Number: 5,439,373
[45] Date of Patent: Aug. 8, 1995

[54] LUMINOUS COMBUSTION SYSTEM

[75] Inventors: John E. Anderson, Somers, N.Y.;
Dennis R. Farrenkopf, Bethel, Conn.;
Arthur W. Francis, Jr., Monroe,
N.Y.; Steven L. Slader, New York,
N.Y.; William J. Snyder, Ossining,
N.Y.

[73] Assignee: Praxair Technology, Inc., Danbury, Conn.

[21] Appl. No.: 119,556

[22] Filed: Sep. 13, 1993

[51] Int. Cl.6 ............................................. F23C 5/00
[52] U.S. Cl. ................................. 431/10; 431/346; 431/190
[58] Field of Search ............... 431/2, 8, 10, 159, 164, 431/181, 165, 166, 167, 187, 190, 346

[56] References Cited

U.S. PATENT DOCUMENTS

| | | | |
|---|---|---|---|
| 4,378,205 | 3/1983 | Anderson | 431/5 |
| 4,403,941 | 9/1983 | Okiura et al. | 431/10 |
| 4,525,138 | 6/1985 | Snyder et al. | 431/187 |
| 4,541,796 | 9/1985 | Anderson | 431/187 |
| 4,622,007 | 11/1986 | Gitman | 432/13 |
| 4,629,413 | 12/1986 | Michelson et al. | 431/10 X |
| 4,690,635 | 9/1987 | Coppin | 431/187 |
| 4,797,087 | 1/1989 | Gitman | 431/10 |
| 4,810,186 | 3/1989 | Rennert et al. | 431/10 X |
| 4,878,829 | 11/1989 | Anderson | 431/8 |
| 4,907,961 | 3/1990 | Anderson | 431/8 |
| 4,927,357 | 5/1990 | Yap | 431/10 X |
| 4,986,748 | 1/1991 | Brown et al. | 431/188 |
| 5,100,313 | 3/1992 | Anderson et al. | 431/8 |
| 5,199,866 | 4/1993 | Joshi et al. | 431/353 |
| 5,242,296 | 9/1993 | Tuson et al. | 431/10 |
| 5,263,849 | 11/1993 | Irwin et al. | 431/6 |

FOREIGN PATENT DOCUMENTS

| | | | |
|---|---|---|---|
| 0052233 | 4/1977 | Japan | 431/10 |
| 2146113 | 4/1985 | United Kingdom | 431/10 |

OTHER PUBLICATIONS

WO 9110864, Jul. 1991; U.S.CL. 431/10; Dykema.

*Primary Examiner*—Carl D. Price
*Attorney, Agent, or Firm*—Stanley Ktorides

[57] ABSTRACT

A combustion system wherein a defined uniform non-stoichiometric mixture of fuel and oxygen is made in a compartment outside a furnace zone and burned inside the furnace zone in a luminous flame while additional make up oxygen is provided into the furnace zone under conditions which avoid diminution of flame luminosity and high $NO_x$ generation.

6 Claims, 2 Drawing Sheets

LUMINOUS COMBUSTION SYSTEM

TECHNICAL FIELD

This invention relates generally to combustion systems which employ oxygen or oxygen-enriched air rather than air to carry out combustion with fuel.

BACKGROUND ART

Nitrogen oxides ($NO_x$) are well known pollutants which are generated during combustion, especially combustion carried out at high temperatures. It is known that the levels of $NO_x$ generated during a combustion reaction may be reduced if pure oxygen or oxygen-enriched air instead of air is used to carry out the combustion because the large volumes of nitrogen present in air are kept away from the combustion reaction and thus kept away from reacting with the oxidant to form $NO_x$ if high flame temperatures can be avoided. Two recent significant advances in this technical field which enable oxygen combustion to proceed without high flame temperatures are the aspirating burner, disclosed and claimed in U.S. Pat. No. 4,541,796 Anderson, and the stabilized jet burner, disclosed and claimed in U.S. Pat. No. 4,907,961 Anderson.

Combustion with oxygen or oxygen-enriched air generally produces a flame which is not readily visually observable. In some situations it is desirable to carry out combustion with an easily observable or luminous flame, especially where adjustment of the flame shape or direction is desired. A flame which is not easily observable is more difficult to adjust accurately.

It is known that the luminosity of a flame may be increased by carrying out the combustion in a manner wherein the fuel is not completely combusted. However, this mode of operation is undesirable both from a fuel consumption and an environmental perspective.

The problem of obtaining a luminous flame occurs primarily when natural gas is the fuel. The main component of natural gas is methane. It is necessary to break down the methane to form carbon since it is the presence of carbon particles which is the primary source of luminosity in a flame. Carbon particles may be obtained by carrying out combustion in a fuel-rich portion and an oxygen-rich portion. However, such procedure is difficult to control effectively and, moreover, significant levels of $NO_x$ are formed in the oxygen-rich region of the combustion.

Accordingly, it is an object of this invention to provide a combustion system wherein a luminous flame is generated while the level of pollutants such as $NO_x$ is maintained at an acceptable level.

SUMMARY OF THE INVENTION

The above and other objects which will become apparent to those skilled in the art upon a reading of this disclosure are attained by the present invention and aspect of which is:

A luminous combustion method comprising:
(A) providing fuel into a first compartment communicating with a furnace zone;
(B) providing from about 10 to 30 percent of the oxygen required to completely combust said fuel into the first compartment and mixing the fuel and oxygen within the first compartment to establish a uniform mixture of fuel and oxygen within the first compartment;
(C) passing the fuel and oxygen mixture from the first compartment into the furnace zone in a uniform velocity profile, and thereafter combusting the fuel and oxidant mixture in a luminous flame within the furnace zone;
(D) providing additional oxygen into a second compartment communicating with the furnace zone;
(E) passing said additional oxygen from the second compartment into the furnace zone at a velocity about the same as the velocity of the mixture of fuel and oxygen passed into the furnace zone and at a point spaced from the point where the mixture of fuel and oxygen is passed into the furnace zone; and
(F) combusting said additional oxygen with uncombusted fuel within the furnace zone.

Another aspect of the invention is:
A luminous combustion system comprising:
(A) a furnace zone;
(B) a first compartment communicating with the furnace zone;
(C) means for providing fuel into the first compartment;
(D) means for providing oxygen into the first compartment such that fuel is mixed with the oxygen within the first compartment to form a uniform mixture;
(E) a second compartment communicating with the furnace zone at a point spaced from the point where the first compartment communicates with the furnace zone; and
(F) means for providing oxygen into the second compartment.

DETAILED DESCRIPTION

The invention will be described in detail with reference to the Drawings.

Figure 1:
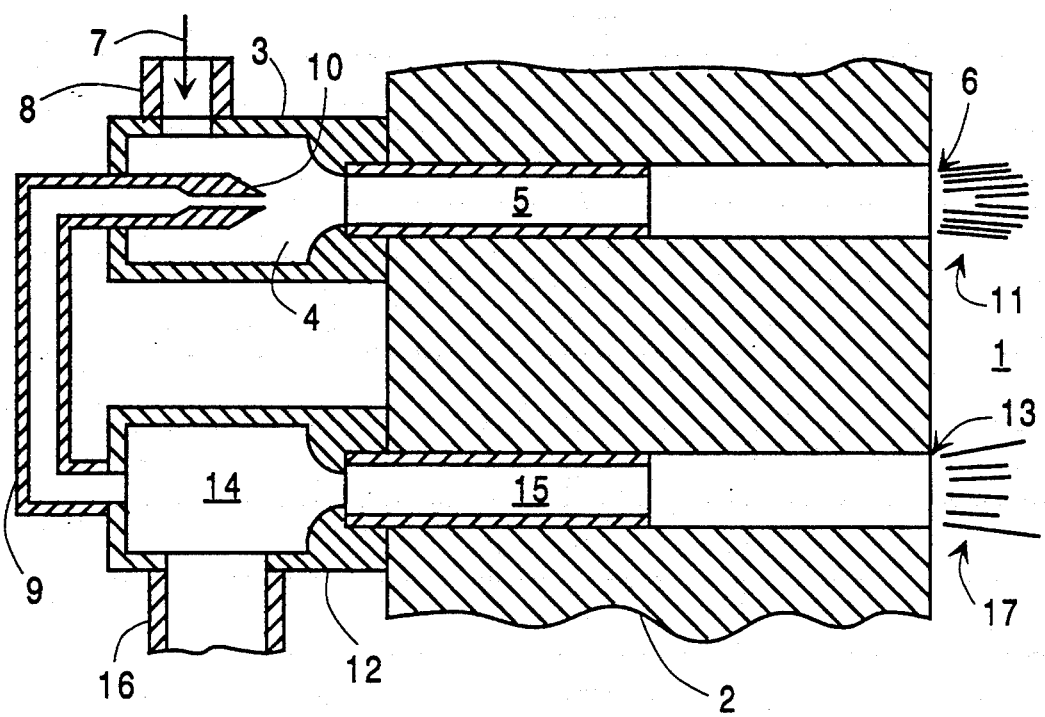
FIG. 1 is a cross-sectional representation of one preferred embodiment of the luminous combustion system of this invention.

Referring now to FIG. 1, furnace zone 1 is bordered by refractory wall 2. The furnace zone may be any volume wherein heat is provided, such as, for example, a glassmelting furnace, a steel reheating furnace, a copper smelting furnace or an aluminum manufacturing furnace. First compartment 3 comprises a larger diameter cavity 4 and a smaller diameter conduit 5 which communicates with furnace zone 1 at 6.

Fuel 7 is provided into first compartment 3 through conduit 8. The fuel may be any gas which contains combustibles which may combust in the furnace zone to form a luminous flame. Among such fuels one can name natural gas, coke oven gas, propane and methane. The benefits of this invention will be most apparent with the use of natural gas or methane as the fuel.

Oxygen is provided into first compartment 3 such as through conduit 9. The oxygen may be provided in the form of technically pure oxygen, i.e., a fluid comprising 99.5 percent or more oxygen, or in the form of oxygen-enriched air, such as a fluid having an oxygen concentration of 30 percent or more. Preferably the oxygen is provided in the form of a fluid having an oxygen concentration of at least 90 percent. The oxygen is provided into the first compartment in an amount from about 10 to 30 percent, preferably from 15 to 25 percent of stoichiometric, i.e., of the amount of oxygen required to completely combust the fuel provided into the first compartment. It is important that the amount of oxygen provided into the first compartment not exceed about 30 percent of stoichiometric in order to achieve the advantageous results of the invention. This aspect of the invention will be discussed in greater detail below.

The oxygen and fuel mix within the first compartment to form a uniform mixture and this uniform mixture is passed into the furnace zone as a fully developed or plug flow, i.e. one in which there is a substantially uniform velocity profile across the flowing stream. A particularly preferred way to achieve the desired uniform mixture and velocity profile is discussed below.

Figure 3:
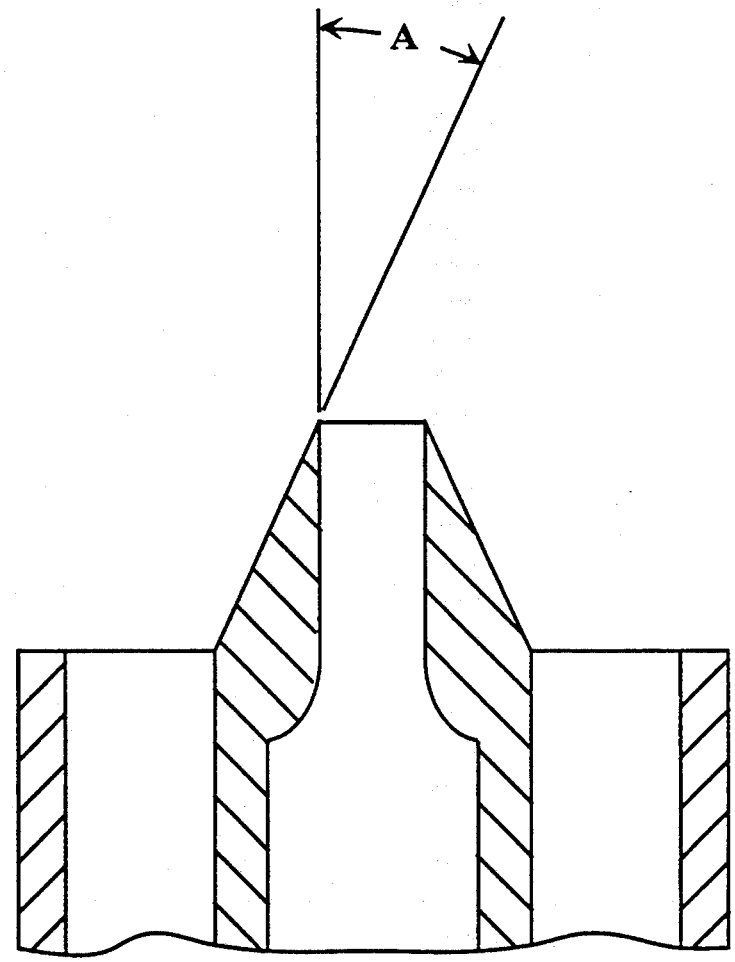
FIG. 3 is a more detailed view of one preferred embodiment of an oxygen nozzle which may be employed in the practice of this invention.

The oxygen is preferably provided into the first compartment at a high velocity sufficient to entrain the fuel provided into the first compartment into the high velocity oxygen stream within the first compartment. Preferably the oxygen is provided into the first compartment at a velocity of at least 200 feet per second (fps) and most preferably at a velocity within the range of from 200 to 500 fps. Preferably, as illustrated in FIG. 1, the oxygen is injected into the first compartment through reduced diameter nozzle 10, i.e., having a diameter which is less than that of the diameter of conduit 9. This is illustrated in greater detail in FIG. 3 wherein the inward taper of nozzle 10 is represented by angle A. Most preferably nozzle 10 has an inward taper of up to 45 degrees. This reduces recirculation eddies and makes it harder to establish a flame within the compartment.

The fuel, which is preferably provided into the first compartment at a lower velocity than is the oxygen, typically at a velocity within the range of from 15 to 80 fps, is entrained into the high velocity oxygen stream within the first compartment and a mixture of fuel and oxygen is obtained. The embodiment illustrated in FIG. 1 is a preferred embodiment wherein first compartment 3 comprises larger diameter cavity 4, wherein the initial entrainment of fuel into the oxygen takes place, and longer but smaller diameter conduit 5 which passes through refractory wall 2 and wherein the fuel and oxygen form a uniform mixture as they pass from larger diameter cavity 4, through conduit 5 and into furnace zone 1. The passage of the fuel oxygen mixture through conduit 5 serves to enhance the mixing of the fuel and oxygen. As the fuel and oxygen mixture passes through conduit 5, it becomes relatively uniform in velocity and composition. The average velocity of the mixture at the point of injection into furnace zone 1 is less than that of the oxygen injected into first compartment 3. Generally the velocity of the mixture of fuel and oxygen injected into furnace zone 1 will be within the range of from 50 to 200 fps.

The mixing of the fuel and oxygen in the first compartment takes place under relatively cool conditions even though the temperature within the furnace zone may be very hot, generally within the range of from 2400° to 3000° F. This occurs because at least part of the first compartment, i.e., larger diameter cavity 4, is on the other side of refractory wall 2 from furnace zone 1, and because the entrainment and mixing of fuel and oxygen is carried out at temperatures wherein combustion of the mixture does not take place within the first compartment. It is an important element of this invention that the mixture of fuel and oxygen pass unburned from the first compartment into the furnace zone. By premixing the oxygen and fuel while cold, a uniform mixture can be obtained before combustion is initiated. This is advantageous both in obtaining a more luminous flame and in minimizing $NO_x$ formation. If combustion were initiated in the cavity as the fuel and oxygen mix, portions of the mixture would be oxygen-rich and other portions would be fuel-rich. The oxygen-rich portions will result in an increase in $NO_x$ formation as well as a decrease in flame luminosity.

The metal parts of the combustion apparatus are either outside of the furnace or recessed several inches within the refractory cavity. Since no combustion occurs within the cavity, the heat load on the metal parts is minor. Consequently water or forced gas cooling are not needed and maintenance of the burner parts is minimal.

The mixture of fuel and oxygen is passed into the furnace zone and thereafter combusts within the furnace zone due to the high furnace zone temperature. Because of the defined non-stoichiometric ratio of fuel and oxygen and the uniform distribution of fuel and oxygen in the fuel-oxygen mixture passed into the furnace zone, the combustion of the fuel and oxygen mixture produces a luminous flame 11. By maintaining control of the oxygen/fuel ratio in a well mixed stream, the conditions for maximizing the luminosity of the flame are achieved. Such control cannot be easily achieved if mixing as well as burning are carried out in the furnace zone.

Second compartment 12 communicates with furnace zone 1 at a point 13 spaced from point 6 where first compartment 3 communicates with furnace zone 1. In the embodiment illustrated in FIG. 1, second compartment 12 comprises larger diameter cavity 14 and smaller diameter conduit 15 which passes through refractory wall 2. Additional oxygen is provided into second compartment 12 and thereafter passed into furnace zone 1. The additional oxygen may be in the form of the same fluids used to provide oxygen into the first compartment. Preferably, the additional oxygen passed into the second compartment will be sufficient, when combined with the oxygen provided into the first compartment, to completely combust the fuel provided into the first compartment. In the embodiment illustrated in FIG. 1, all of the oxygen is passed into second compartment 12 and a portion of the oxygen is withdrawn from second compartment 12 through conduit 9 and passed into the first compartment. In this case the additional oxygen provided into the second compartment would be the oxygen which is not passed into the first compartment through conduit 9.

The oxygen is provided into the second compartment through conduit 16. There is a nozzle set at the entrance to conduit 15. By properly sizing this nozzle and nozzle 10 the desired oxygen distribution between the two compartments can be obtained. In this way the additional oxygen is passed into the furnace zone at 13 at a velocity which is about the same as the velocity of the fuel-oxygen mixture as it is passed into furnace zone 1 at 6. By "about the same" it is meant within plus or minus 50 fps. In this way neither of the streams are drawn into one another to cause premature mixing of the fuel-oxygen mixture with the oxygen stream 17. Such premature mixing and combustion would increase the $NO_x$ generation of the combustion reaction as well as decrease the luminosity of the combustion flame.

In addition, in order to further guard against premature mixing of the two streams in the furnace zone, the additional oxygen is passed into the furnace zone at a point 13 which is spaced from the point 6 where the mixture of fuel and oxygen is passed into the furnace zone. Generally, this spacing is at least two times the diameter of the opening of the first compartment where it communicates with the furnace zone.

The fuel-oxygen mixture and the additional oxygen streams will both entrain in furnace gases prior to interacting. With this dilution, the final flame temperature will be reduced causing less $NO_x$ to be formed.

The fuel-oxygen mixture combusting in a luminous flame mixes with the additional oxygen downstream in the furnace zone and the uncombusted fuel combusts with the additional oxygen to complete the combustion. The uncombusted fuel may comprise totally uncombusted or incompletely combusted fuel material. In this way the high luminosity of the flame is maintained and the generation of high levels of $NO_x$ is avoided.

As mentioned, it is important that combustion does not take place within cavity 4 and conduit 5 in the first compartment. The importance of working within a given range of operating parameters to avoid combustion within the chamber was demonstrated in a series of tests described below and the results of which are reported in FIG. 2.

An embodiment of the invention similar to that illustrated in FIG. 1 was employed. The fuel was natural gas and was provided into the first compartment at flow rates between 500 and 3000 cfh. The oxygen was provided in the form of a fluid having an oxygen concentration of 100 percent (technically pure) into the first compartment at flow rates between 500 and 4000 cfh. The diameter of the first compartment at the furnace injection point was 1.5 inches.

Figure 2:
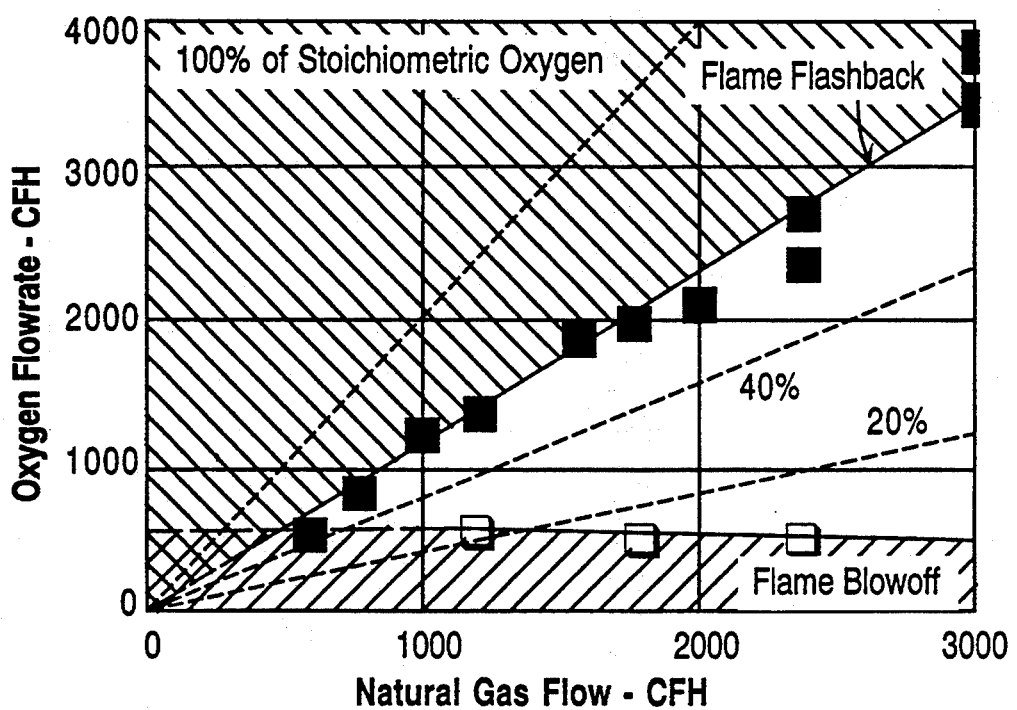
FIG. 2 is a graphical representation of experimental results showing the importance of the oxygen concentration in the fuel/oxygen mixture in the practice of this invention.

Two curves, one for flame flashback and one for flame blowoff at the oxygen nozzle were established as indicated in FIG. 2. If the burner was operated in the area in FIG. 2 above the flashback curve (shaded area with lines drawn diagonally from upper left to the lower right), the flame flashed back repetitively into the compartment. Flashback is a function of the percent of stoichiometric oxygen and cavity diameter for the first compartment. If the percent of stoichiometric oxygen is kept below 40 percent of stoichiometric oxygen, flashback does not occur. For optimum operation of the burner to obtain a luminous flame, the percent of stoichiometric oxygen for complete combustion in the first compartment should be within the range of from 10 to 30 percent. For this operating range, flashback into the compartment is not a problem.

A stable flame could be established around the oxygen nozzle at relatively low oxygen flow rates. The flame blowoff curve is shown in FIG. 2 for an oxygen nozzle diameter of ⅜ inch. At oxygen flow rates below the curve (shaded area with lines drawn diagonally from the lower left to the upper right), a flame around the oxygen jet was stable. At oxygen flow rates above the flame blowoff curve, the flame was extinguished. The flame blowoff is a function of oxygen jet velocity. For an oxygen jet velocity of 200 fps or more, the flame around the oxygen jet is not stable and extinguishes.

In the practice of this invention as described herein, the burner operates so that oxygen supplied to the first compartment is between 10 and 30 percent of that required for complete combustion of the fuel and the oxygen velocity at nozzle 10 in the first compartment is at least 200 fps. For these operating conditions, the burner operates within the clear area as shown in FIG. 2 and combustion within the cavity for the first compartment can not occur. The flame can not flashback and a flame around the oxygen jet will extinguish.

Now with the luminous combustion system of this invention one can generate a luminous flame to facilitate the control and manipulation of flame shape and direction while still efficiently combusting the fuel available for combustion and also avoiding the generation of high levels of $NO_x$. Although the invention has been described in detail with reference to a certain embodiment, those skilled in the art will recognize that there are other embodiments of the invention within the spirit and the scope of the claims.

We claim:
1. A luminous combustion method comprising:
    (A) providing fuel into a first compartment communicating with a furnace zone;
    (B) providing at a high velocity from about 10 to 30 percent of oxygen required to completely combust said fuel into the first compartment in the form of a fluid having an oxygen concentration of 30 percent or more, and entraining the fuel into said oxygen within the first compartment to establish a uniform mixture of fuel and oxygen within the first compartment;
    (C) passing the fuel and oxygen mixture from the first compartment into the furnace zone in a uniform velocity profile and at a velocity less than that of said oxygen as it is passed into the first compartment and thereafter combusting the fuel and oxidant mixture in a luminous flame within the furnace zone;
    (D) providing additional oxygen into a second compartment communicating with the furnace zone;
    (E) passing said additional oxygen from the second compartment into the furnace zone at a velocity about the same as the velocity of the mixture of fuel and oxygen passed into the furnace zone and at a point spaced from the point where the mixture of fuel and oxygen is passed into the furnace zone; and
    (F) combusting said additional oxygen with uncombusted fuel within the furnace zone.
2. The method of claim 1 wherein from about 15 to 25 percent of the oxygen required to completely combust the fuel is provided into the first compartment.
3. The method of claim 1 wherein the oxygen is provided into the first compartment at a velocity within the range of from 200 to 500 feet per second.
4. The method of claim 1 wherein the fuel and oxygen mixture is passed from the first compartment into the furnace zone at a velocity within the range of from 50 to 200 feet per second.
5. The method of claim 1 wherein the additional oxygen passed from the second compartment into the furnace zone comprises from about 70 to 90 percent of the oxygen required to completely combust the fuel.
6. The method of claim 1 wherein the oxygen is provided in the form of a fluid having an oxygen concentration of at least 90 percent.

* * * * *